United States Patent [19]

Okamoto et al.

[11] Patent Number: 4,955,191
[45] Date of Patent: Sep. 11, 1990

[54] COMBUSTOR FOR GAS TURBINE

[75] Inventors: Hiroaki Okamoto; Takeshi Takahara, both of Yokohama; Fukuo Maeda, Machida, all of Japan

[73] Assignee: Kabushiki Kaisha Toshiba, Kawasaki, Japan

[21] Appl. No.: 262,982

[22] Filed: Oct. 26, 1988

[30] Foreign Application Priority Data

Oct. 27, 1987 [JP] Japan .................................. 62-270576

[51] Int. Cl.$^5$ .............................. F02C 3/14; F02C 3/30
[52] U.S. Cl. .................................. 60/39.3; 60/39.55; 60/746
[58] Field of Search ................ 60/39.05, 39.3, 39.53, 60/39.55, 733, 737, 746, 747

[56] References Cited

U.S. PATENT DOCUMENTS

| | | | |
|---|---|---|---|
| 3,693,347 | 9/1972 | Kydd et al. | 60/39.55 |
| 3,826,080 | 7/1974 | De Corso et al. | 60/39.55 |
| 4,112,676 | 3/1977 | Decorso . | |
| 4,259,837 | 4/1981 | Russell et al. | 60/39.55 |
| 4,603,548 | 8/1986 | Ishibashi et al. | 60/746 |
| 4,733,527 | 3/1988 | Kidd | 60/39.3 |
| 4,735,052 | 4/1988 | Maeda et al. | 60/733 |
| 4,766,721 | 8/1988 | Iizuka et al. | 60/747 |

FOREIGN PATENT DOCUMENTS 149527 7/1986 Japan .................................. 60/39.05

OTHER PUBLICATIONS

Influence of Gas Turbine Combustor Design and Operating Parameters in Effectiveness of $NO_x$ Suppression by Injected Steam or Water, Trans. of ASME Journal of Engineering for Gas Turbines and Power, vol. 107, pp. 706–713; G. L. Touchton; Jul. 1985.

Primary Examiner—Louis J. Casaregola
Attorney, Agent, or Firm—Oblon, Spivak, McClelland, Maier & Neustadt

[57] ABSTRACT

A gas turbine combustor for a gas turbine plant comprises an outer casing and a combustor liner disposed in the outer casing, the interior of the combustor liner constituting a combustor chamber divided into a first stage of combustion area and a second stage of combustion area, disposed downstream of the first stage combustion area. The gas turbine combustor further comprises a nozzle member for supplying a first stage fuel into the first stage combustion area, a header for supplying a second stage fuel into the second stage combustion area, and a header for further supplying water or water vapor into the first stage combustion area. The nozzle member and both the headers are disposed in an end plate closing one end of the outer casing in a concentrical fashion. The flow rates of the first and second stage fuels and the water vapor are controlled by a control unit equipped with the gas turbine combustor.

9 Claims, 9 Drawing Sheets

COMBUSTOR FOR GAS TURBINE

BACKGROUND OF THE INVENTION

This invention relates to a combustor to be incorporated in a gas turbine plant or a combined cycle power generation plant, and more particularly, to a combustor for a gas turbine adapted to substantially reduce density of nitrogen oxides ($NO_x$) contained in a gas exhausted from the gas turbine.

A gas turbine plant or a combined cycle power generation plant generally includes a gas turbine combustor which burns a fuel gas, and a combustion gas from the combustor is fed to a gas turbine to drive the same. With the gas turbine of this character, it is known that the thermal efficiency of the turbine can be improved by increasing a temperature at an inlet port of the turbine, and for this purpose, in the known gas turbine plant, it is intended to increase the temperature at the inlet port of the turbine, i.e. temperature at an outlet port of the combustor.

However, it is impossible to increase a combustion gas temperature of the combustor without any restriction because of heat resisting limitation to materials constituting the gas turbine, combustor, etc. and countermeasure to $NO_x$ generated in the combustor.

The fuel and air are diffused, mixed and burned in the combustor, and under this condition, the generation of $NO_x$ is caused when the mixed gas with ratio of equivalency of the fuel and the air being near "1" at a temperature near the adiabatic flame temperature and the combustion gas in the combustor is locally highly heated.

In a known method for reducing the $NO_x$ generated in the gas turbine combustor, water vapor is introduced thereinto, and more in detail, in a single stage combustor in which fuel is introduced into the combustor through a fuel nozzle located at a top portion thereof, then diffused and burned, the water vapor is introduced into the combustor near the fuel nozzle to lower the temperature of the fuel gas, thus restricting the generation of the $NO_x$.

As another $NO_x$ reducing method, there is known a diluted premix fuel combustion method in which the fed fuel is mixed with air having an amount more than that principally required to dilute evenly the mixed fuel gas and the thus diluted fuel gas is subjected to the premix combustion to prevent the fuel gas from locally highly heating and hence to restrict the generation of the $NO_x$.

With the diluted premix fuel combustions method of this character, however, the combustion of the fuel is not stably carried out because of the use of the diluted premix fuel gas. In order to obviate this defect, a prior technique provides a gas turbine combustor which applies a two stage premix combustion method for stabilizing the combustion and in which a combustion chamber defined in the combustor liner is divided into two staged combustion areas. In the combustor of this two staged combustion type, the first combustion area disposed on the upstream side of the fuel gas is formed as a high temperature gas area wherein stable flame is generated by using a small amount of the first stage fuel and the diluted premix fuel gas, which is hardly flammable, in the second combustion area is then burned stably by the high temperature combustion gas generated in the first combustion area.

With the two stage premix combustor of this known type, however, it is necessary to carry out the diffusion-combustion mentioned before or combustion nearly the diffusion-combustion, so that there is a fear of generating the $NO_x$ having an amount approximately equal to that generated in the single stage combustor. Thus, the conventional two stage premix combustor has also a limitation to the restriction of the generation of the $NO_x$.

In the known method of reducing the generation of the $NO_x$ in the gas turbine combustor by injecting the water vapor, a large amount of the water vapor is used because the vapor amount is determined in respect of the entire fuel flow amount, and in addition, there is a fear of generating harmful waste other than the $NO_x$ caused by impurities contained in the water vapor and a fear of corroding members or elements such as turbine blades by means of the impurities. In order to obviate these defects, the generation of the water vapor from pure water free from impurities is needed, which requires much cost and extra system. Nevertheless, the water vapor injected into the gas turbine combustor does not perform effective work such as steam in a steam turbine and exhausted into atmosphere as a part of the exhaust gas. With a combined cycle power plant in which a gas turbine and a steam turbine are operatively combined, the working efficiency of the power plant is relatively lowered by about 1% by the injection of the water vapor.

On the other hand, for the two stage premix combustor of the conventional type, since it is not required to inject the water vapor into the combustor, the generation of the $NO_x$ can be reduced without lowering the working efficiency of the plant.

However, with the conventional two stage premix combustor, no means is equipped to reduce the $NO_x$ generation, and accordingly, the combustor of this type has provided a problem for more effectively reducing the $NO_x$ generation. For example, the combined cycle power plant is equipped with a large sized denitrating device for reducing the harmful $NO_x$ in the combustion gas, and the installation of such a denitrating device requires much cost, thus providing a significant problem for the combined cycle power plant.

SUMMARY OF THE INVENTION

An object of this invention is to substantially eliminate defects or drawbacks encountered in the conventional technique described above and to provide an improved gas turbine combustor for a gas turbine plant capable of substantially removing the occurrence of $NO_x$ in the gas turbine plant and maintaining an operational efficiency of the gas turbine plant.

Another object of this invention is to provide a gas turbine combustor, in accordance with the above object, capable of making compact or eliminating a denitrating unit to be incorporated in the gas turbine plant.

These and other objects can be achieved according to this invention by providing a gas turbine combustor for a gas turbine plant comprising an outer casing and a combustor liner disposed in the outer casing, the interior of the combustor liner constituting a combustion chamber divided into a first stage of combustion area and a second stage of combustion area disposed downstream of the first stage combustion area, and the gas turbine combustor further comprises a nozzle member for supplying a first stage fuel into the first stage combustion area, a header for supplying a second stage fuel into the second stage combustion area, and a header for further supplying water or water vapor into the first stage combustion area. The nozzle member and both the headers are disposed to an end plate closing one end opening of the outer casing in a concentrical fashion.

In a preferred embodiment, the gas turbine combustor further includes a control operation unit for controlling or regulating flow rate of the water or water vapor in relation to flow rates of the first and second stage fuels.

According to the gas turbine combustor of the character described above, water or water vapor is supplied into the first stage combustion area in the combustion chamber to prevent the occurrence of a locally highly heated area in a diffusion burning portion in the combustion chamber, thus substantially eliminating the occurrence of $NO_x$. The second stage combustion area is defined on the downstream side of the first stage combustion area in the combustion chamber and a premixture fuel diluted by air is supplied into the second stage combustion area, so that the diluted premixture burning portion inclusive of substantially no $NO_x$ can be defined in the second stage combustion area, thus significantly reducing the exhaust amount of $NO_x$ in comparison with the conventional gas turbine combustor.

In addition, although the operational efficiency of the gas turbine plant may be somewhat reduced by the introduction of the water or water vapor in the first stage combustion area of the gas turbine combustor of two-stage type, the supply amount of the water or water vapor is determined in connection with the flow rate of the first stage fuel, and not to the total fuel flow rate, so that the reduction of the operational efficiency of the gas turbine plant can be remarkably improved in comparison with the conventional plant of single stage type. Accordingly, in view of the two-stage combustion type, a gas turbine plant can be operated with substantially no reduced operational efficiency.

The preferred embodiments of this invention will be described further in detail hereunder with reference to the accompanying drawings.

DESCRIPTION OF THE PREFERRED EMBODIMENTS

In advance of the detailed description of the preferred embodiments according to this invention, a conventional technique of this art of field will be described hereunder with reference to FIGS. 1 to 2 for the better understanding of this invention.

Figure 1:
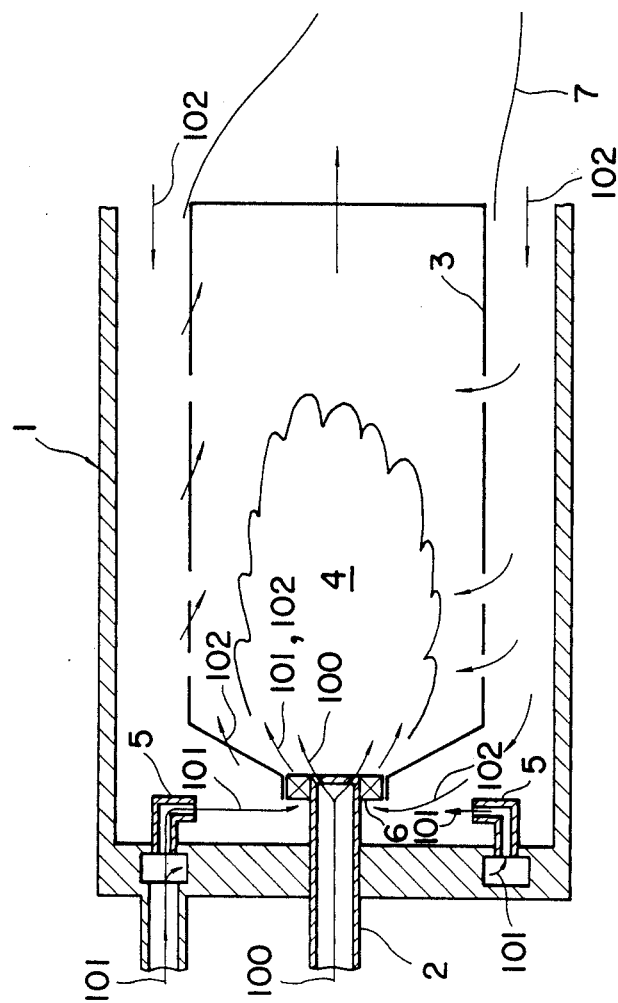
FIG. 1 is a longitudinal sectional view of an illustration of a conventional single stage gas turbine combustor.
Figure 2A:
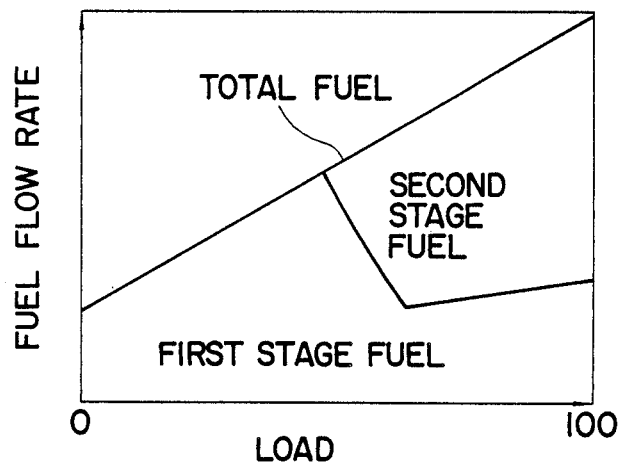
FIGS. 2A and 2B show graphs representing relationships between the fuel distributions of the single and two stage combustion areas and load applied to a conventional two stage premix combustor and between the $NO_x$ density and that load, respectively.
Figure 2B:
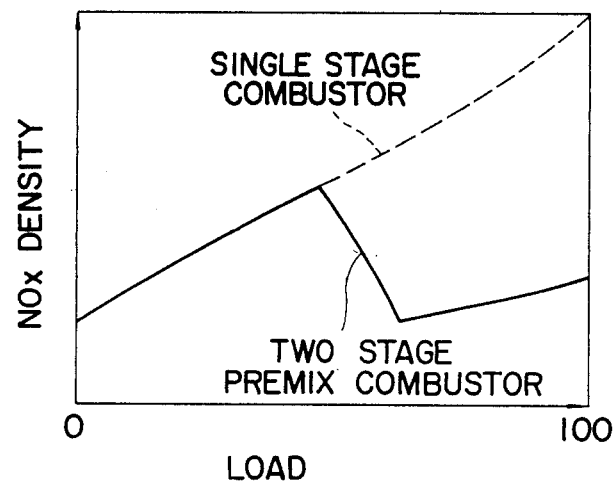

A single stage combustor of the character described hereinbefore has a construction briefly shown in FIG. 1 as a longitudinal sectional view. With the gas turbine combustor 1 shown in FIG. 1, a fuel 100 is injected into a diffusion-combustion area 4 in a combustor liner 3, i.e. inner cylinder, through a fuel injection nozzle member 2 and a water vapor 101 is injected in the combustor 1 through a water vapor injection nozzle member 5. The water vapor 101 injected is first preliminarily mixed with compressed air 102 fed through a compressor, not shown, and the thus mixed fluid is fed into the diffusion-combustion area 4 to be mixed with the fuel 100 in the combustor liner 3 through a swirler 6 mounted on the head portion of the liner 3. The gas generated by the diffusion-combustion is then delivered to a gas turbine, not shown in FIG. 1, through a transition piece 7 to drive the gas turbine. The combustion gas used for driving the gas turbine is thereafter exhausted as an exhaust gas into the atmosphere directly or through an exhaust heat recovery boiler.

The conventional single stage combustor of this structure provides the defects or drawbacks described hereinbefore.

The conventional technique of this field also provides a two stage premix combustor of the character described before, which also involves the defects or drawbacks described. The fuel distribution into the first and second combustion areas of the gas turbine combustor adopting the conventional two stage premix fuel combustion method is performed as represented by a graph shown in FIG. 2A. The $NO_x$ density in this method is represented by a graph shown in FIG. 2B, in which a broken line represents the case using the single stage combustor in which water vapor is not injected. It will be understood from FIGS. 2A and 2B that the density of $NO_x$ generated in the gas turbine combustor has a characteristic curve substantially similar to that of the distribution of the first stage fuel amount.

As described above or hereinbefore, at any rate, the known methods for reducing the generation of the $NO_x$ in the gas turbine combustor by injecting the water vapor involves many defects or drawbacks. These defects or drawbacks can be substantially eliminated by a gas turbine combustor according to this invention.

Figure 3:
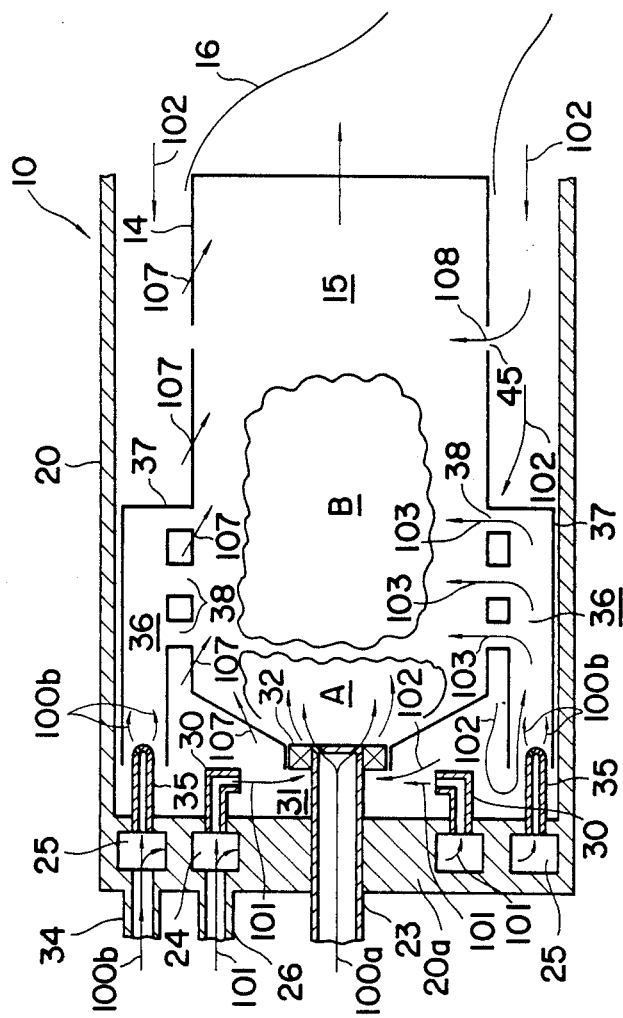
FIG. 3 is a longitudinal sectional view of a gas turbine combustor according to this invention.
Figure 4:
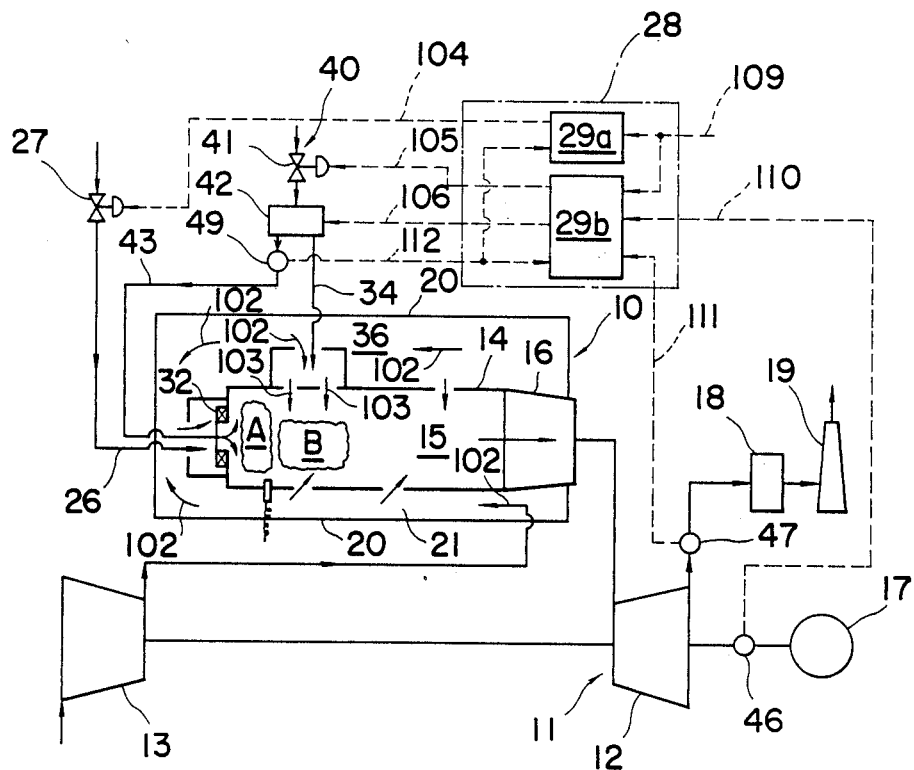
FIG. 4 is a diagram representing a gas turbine plant equipped with the gas turbine combustor with a control system therefor according to this invention.
Figure 5:
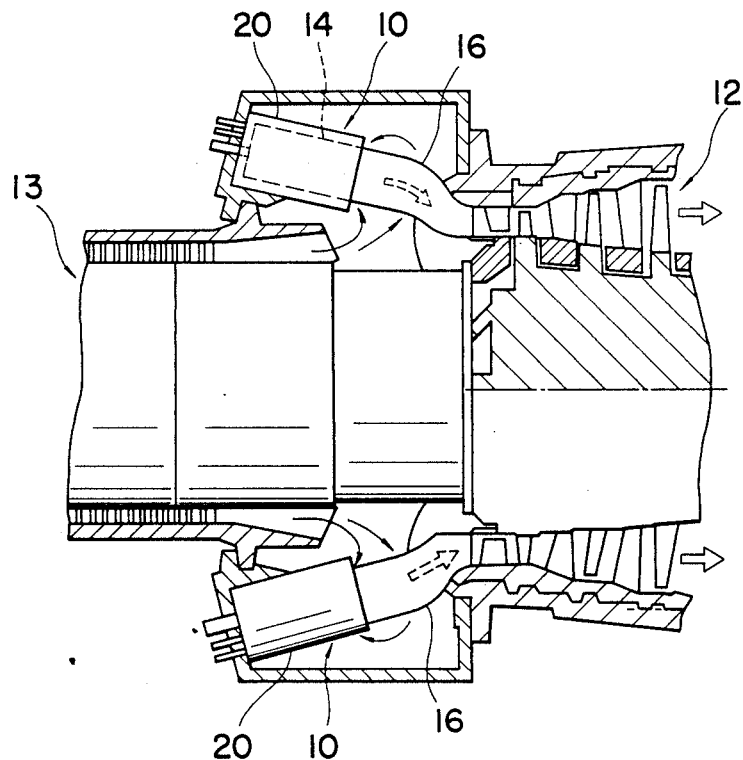
FIG. 5 is a sectional view of a gas turbine plant, partially broken away, equipped with the gas turbine combustor shown in FIG. 3.

A gas turbine combustor 10 shown in FIG. 3 to be incorporated in a gas turbine plant 11 shown in FIG. 4 or 5 is of the type in which two stage premix combustion system is adopted according to this invention.

The gas turbine plant 11 shown in FIG. 4 or 5 generally operates in the following manner. A compressed air compressed and delivered by a compressor 13 arranged coaxially with a gas turbine 12 is guided into the combustor 10, and the compressed gas introduced into the combustor 10 is burned with a fuel in a combustion chamber 15 defined in a combustor liner 14 located in the combustor 10. The combustion gas is fed through a transition piece 16 to the gas turbine 12 to operate the same and hence to drive a generator 17.

The combustion gas after driving the gas turbine is exhausted into atmosphere as an exhaust gas through a denitrating device 18 and a chimney 19. The exhaust gas includes the remarkably reduced $NO_x$, and accordingly, the denitrating device can be made compact under the provision of the present environmental criteria or, in a certain case, it will not be necessary to incorporate the denitrating device in the plant as occasion demands. In the other case where the gas turbine combustor 10 is incorporated in the combined cycle power plant, it is necessary to locate an exhaust heat recovery boiler, not shown, on the downstream side of the gas turbine 12, and the exhaust heat recovery boiler generates steam to drive a steam turbine plant, not shown, by using the exhaust heat of the exhaust gas.

As shown in FIG. 3, a cylindrical liner 14 is arranged in the outer casing 20 of the combustor 10 in coaxial alignment therewith so that the combustion chamber 15 is defined in the liner 14, and an annular passage 21 is defined between the outer casing 20 and the inner liner 14 so as to introduce the compressed air 102 from the compressor 13 through the passage 21. The combustion chamber 15 is sectioned into the first stage combustion area A and the second stage combustion area B. The outer casing 20 may be of a cylindrical structure as shown or the like structure.

The first stage nozzle member 23 is located substantially in the central portion of one end plate 20a of the casing 20 on the side of the head, i.e. front, portion of the inner liner 14, and an annular vapor or water header 24 and an annular second stage fuel header 25 are formed in the end plate 20a substantially concentrically with the first stage fuel nozzle 23, which extends through the end plate 20a towards the head portion of the combustor liner 14 for injecting the fuel 100a for the first stage combustion into the first stage combustion area A from the nozzle member 23 in a diffused manner.

The water vapor 101 or water is supplied to the vapor header 24 through a vapor supply tube 26 as shown in FIG. 4 and the flow rate or amount of the vapor is regulated by a control valve 27 located on the way of the supply tube 26, the control valve 27 being controlled in response to a vapor rate control signal 104 generated from a vapor amount controller 29a of an operating unit 28.

The vapor header 24 is provided with a plurality of injection nozzles 30, as shown in FIG. 3, the front ends of which are directed so that the water vapor is injected towards a swirler 32 located in a space 31 formed at the head portion of the combustor liner 14. The swirler 32 is mounted on the injecting end of the first stage fuel nozzle 25 and acts to mix the water vapor injected into the space 31 with the compressed air, and the thus mixed fluid is injected into the first stage combustion area A as a swirl flow through cooling air holes formed in the swirler 32 and the head portion of the combustion liner 14.

Fuel 100b for the second stage combustion is fed to the second stage fuel header 25 through a fuel supply tube 34 and then injected into a premixing chamber 36 through a plurality of second stage fuel nozzles 35. The premixing chamber 36 is formed by, for example, eight premixing casings 37 each of rectangular or circular cross section and located between the outer casing 20 and the liner 14, and the fuel 100b is premixed in the premixing chamber 36 with the compressed air from the compressor 13 to create a premixture air 103 of the second stage fuel diluted by air with diluted fuel. The premixed air 103 is injected towards the second stage combustion area B in the combustor liner 14 through a plurality of injection ports 38 formed in the outer periphery of the liner 14 to prevent the back fire and to burn the premixed air in the combustion area B. The premixing chamber 37 may be constructed as an annular chamber formed around the liner 14.

In a fuel supply system 40 for supplying the fuels 100a and 100b to the fuel nozzles 23 and 25 are arranged a total fuel flow control valve 41 and a fuel distributor 42, which are controlled in response to signals 105 and 106 transmitted from the fuel flow controller 29b of the control operation unit 28. The fuel distributor 42 distributes the first stage fuel 100a and the second stage fuel 100b which are respectively fed to the first and second stage fuel nozzles 23 and 25 and hence to the first and second stage combustion areas A and B.

The combustion gas generated in the combustion areas A and B is mixed with a liner cooling air 107 supplied through cooling a holes, not shown, formed in the peripheral wall of the liner 14, and a diluted air 108 supplied through diluted air holes 45 formed in the liner wall is then flown out from the rear end opening of the liner 14 towards the gas turbine 12 through the transition piece 16.

A control system of a gas turbine combustor 10 is represented by the arrangement shown in FIG. 4 in which the water vapor flow amount control valve 27 and the fuel flow rate control valve 41 are controlled by the control operation unit 28, which includes the fuel flow rate controller 29b into which are respectively inputted a load setting signal 109 from a load setter, not shown, of the turbine plant, a signal 110 representing the revolution number of the gas turbine from a gas turbine revolution number detector 46, a detecting signal 111 representing an exhaust gas temperature of the gas turbine from a gas turbine exhaust gas temperature detector 47 and a signal 112 representing the first stage fuel flow rate from a first stage fuel flow meter 48. These signals 109, 110, 111 and 112 are processed and operated in the fuel flow ate controller 29b, which then outputs the total fuel flow rate control signal 105 and the fuel distribution control signal 106 into a total fuel flow rate control valve 41 and a fuel distributor 42, respectively.

The control operation unit 28 further includes the vapor flow rate controller 29a into which a predetermined setting value of the ratio of the vapor flow rate with respect to the first stage fuel flow rate is inputted so as to operate the vapor flow rate by multiplying the setting value by the first stage fuel flow rate signal 112 and to output the flow rate control signal 104, thus controlling the vapor flow amount 101.

The gas turbine combustor 10 according to this invention will operate in accordance with the following manner.

The gas turbine combustor 10 is operated in accordance with a two stage premix combustion method in which a suitable amount of water vapor 101 is fed and distributed evenly into the first combustion area A to restrict the generation of the local high temperature combustion area to reduce the $NO_x$.

Figure 6:
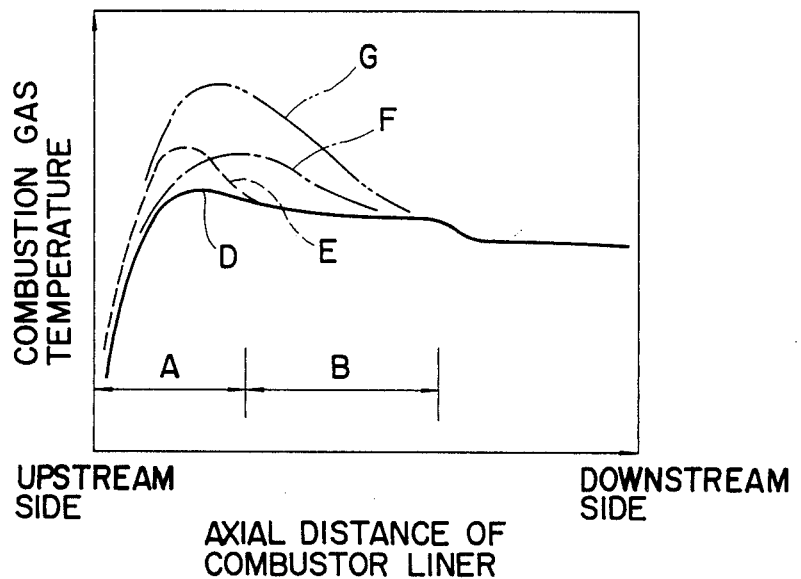
FIG. 6 is a graph representing a relationship between the combustion gas temperature and the axial distance of a combustor liner.

A graph shown in FIG. 6 represents the local maximum temperature distribution due to the combustion gas in the combustor liner 14, and referring to the graph of FIG. 6, the solid line curve D represents the use of the gas turbine combustor 10 of this invention, a chain line curve E represents the use of a gas turbine combustor adopting the two stage premix combustion method of no vapor injection type, a one-dot and dash line curve F represents the use of a gas turbine combustor as the first stage combustor into which vapor is injected, and two-dot and dash line curve G represents the use of a gas turbine combustor as the single stage combustor into which vapor is not injected. These temperature distribution curves D, E, F and G show the fact that the temperature distribution is made most smooth with the lowest combustion gas temperature in the case of using the gas turbine combustor 10 according to this invention.

Figure 7:
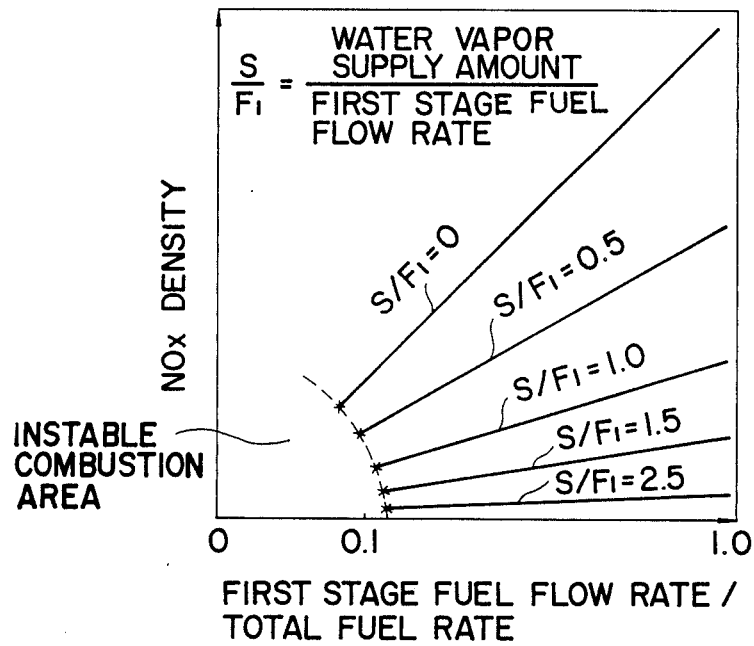
FIG. 7 is a graph representing a relationship between the fuel flow rate and the $NO_x$ density showing of the limitation of the first stage fuel flow rate.

FIG. 7 shows a graph for explaining the limitation of the flow rate of the first stage fuel flow 100a in the gas turbine combustor 10 adopting the two-stage premix combustion method. The graph shows the trend of the case in which the equivalent ratio of the premixed air 103 with respect to the compressed air 102 is below the value of 0.6, in which (the equivalent ratio)=(actual fuel-air ratio)÷(theoretical fuel-air ratio) and the fuel-air ratio is a value obtained by dividing the fuel flow rate by the air flow rate. As is apparent from the graph of FIG. 7, the density of the $NO_x$ increases substantially in proportion to the first stage fuel flow rate and decreases as the ratio of $S/F_1$ (water vapor flow rate/first stage fuel flow rate) increases. However, when the $S/F_1$ ratio gradually increases, an instable combustion area moves towards an area including much flow rate of the fuel 100a, and there is observed an instable combustion boundary at which the ratio of the flow rate of the first stage fuel 100a, with respect to the flow rate of the total fuel 100 nearly equals to the value of 0.1. Accordingly, as shown in FIG. 7, it will be required for the first stage fuel flow rate of the gas turbine combustor 10 adopting the two-stage premix combustion method to be over 1/10 of the total fuel flow rate.

Figure 8:
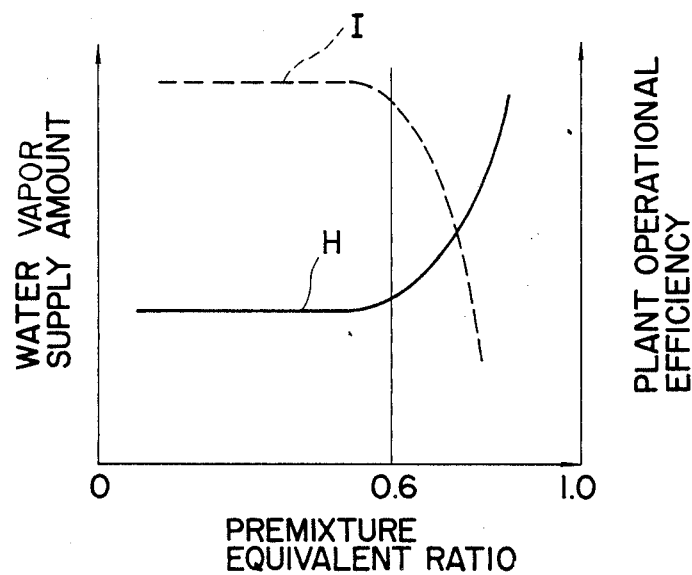
FIG. 8 is a graph showing the limitation of the equivalent ratio of the premixture in relation to the water vapor supply amount and the operational efficiency of the plant.

In the graph of FIG. 8, the solid line H represents the relationship between the equivalent ratio of the premixed air 103 and the water vapor to be injected and the chain line I represents the relationship between the equivalent ratio of the premixed air 103 and the operation efficiency of the turbine plant, both the relationships being obtained under the condition that the flow rate of the first stage fuel 100a and the density of the $NO_x$ are maintained to be constant. Referring to the graph of FIG. 8, it will be understood that when the equivalent ratio of the premixed air 103 is below the value of about 0.6, the water vapor is injected only for the purpose of reducing the generation of the $NO_x$ in the diffusion combustion area because the $NO_x$ amount generated in the premixture combustion area (the second stage combustion area B) is negligible, whereas when the equivalent ratio of the premixed air 103 is over the value of about 0.6, the generation of the $NO_x$ in the premixture combustion area rapidly increases, and accordingly, a voluminous amount of the water vapor will have to be further injected in the premixture combustion area B in order to constantly maintain the density of the $NO_x$. The graph thus shows the fact that the operation efficiency of the gas turbine plant rapidly lowers when the equivalent ratio of the premixed air 103 exceeds the value of about 0.6.

Figure 9:
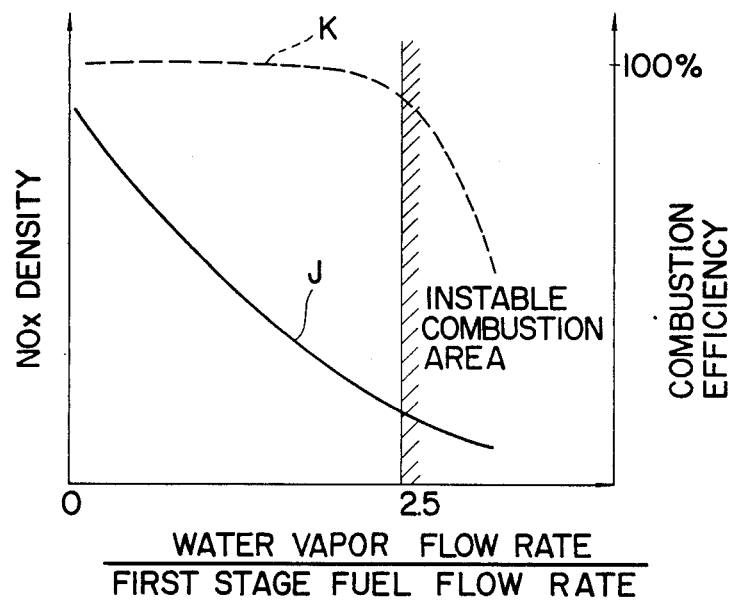
FIG. 9 is a graph showing for the explanatory of the limitation of the water vapor flow rate in relation to the $NO_x$ density and the burning efficiency.

FIG. 9 is also a graph for explaining the limitation of the water vapor flow rate, in which the solid line J represents the relationship between the density of the $NO_x$ and the $S/F_1$ ratio (S:water vapor flow rate and $F_1$:first stage fuel flow rate) and the chain line K represents the relationship between the combustion efficiency and the $S/F_1$ ratio. Referring to the graph of FIG. 9, it will be understood that the generation of the $NO_x$ is reduced according to the increasing of the water vapor rate to be injected, whereas the combustion efficiency rapidly lowers when the water vapor flow rate exceeds the first stage fuel flow rate more than about 2.5 times, i.e. $S/F_1 \geq 2.5$. Such an adverse phenomenon is commonly observed with respect to the two-stage premix combustor and the single-stage combustor. According to this operational fact, it may be said to be desired for the gas turbine combustor that the flow rate of the water vapor to be injected is limited to the flow rate less than 2.5 times of the first stage fuel rate.

Figure 10:
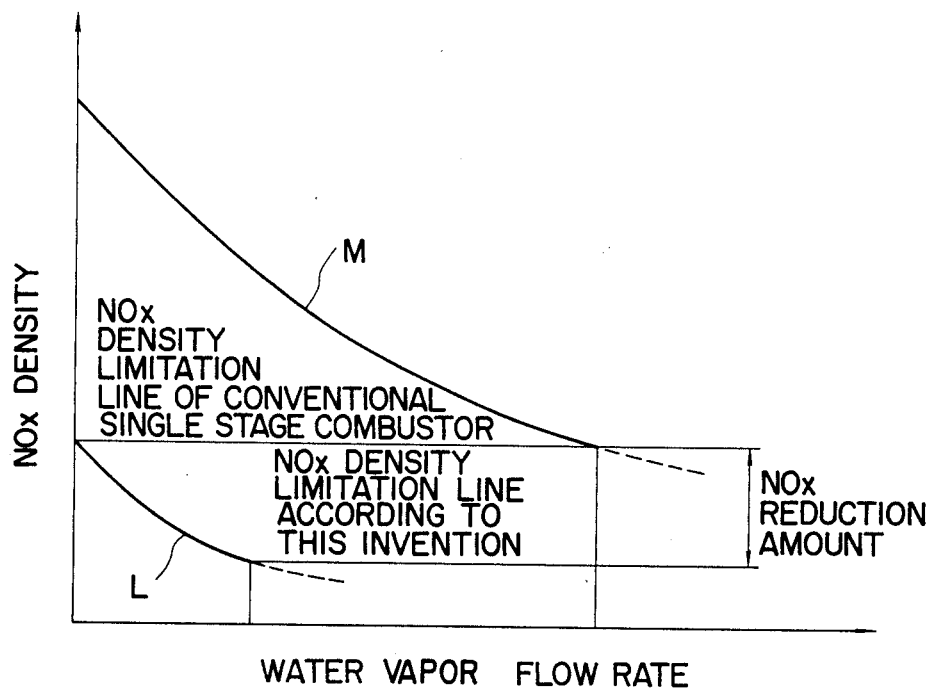
FIG. 10 is a graph representing a relationship between the $NO_x$ density and the water vapor flow rate.

The graph of FIG. 10 shows the characteristic curves representing the relationship between the absolute value of the water vapor flow rate and the density of the $NO_x$ as the compared experimental data obtained by using the conventional single-stage combustor and the two-stage premix combustor of this invention. Referring to the graph of FIG. 10, it is found that the density of the $NO_x$ can be reduced as shown by the solid line L according to the gas turbine combustor of this invention to the extent of one-third (⅓) with respect to the density of the $NO_x$ generated in the conventional single-stage combustor as shown by the solid line M. Moreover, the water vapor amount to be injected can be also reduced to the extent of about one-third (⅓) according to the gas turbine combustor of this invention, thus possibly restricting the lowering of the operational efficiency of the turbine plant.

The gas turbine combustor according to this invention has some limited matters concerning the ratio of the first stage fuel flow rate with respect to the total fuel flow rate, the equivalent ratio of the premixed air with respect to the fuel in the second combustion stage and the flow rate of the water vapor, and accordingly, it is necessary to suitably control the fuel flow rates and water vapor rates in the first and second combustion stages in accordance with the loads applied to the gas turbine by the control operating unit 28.

Figure 11A:
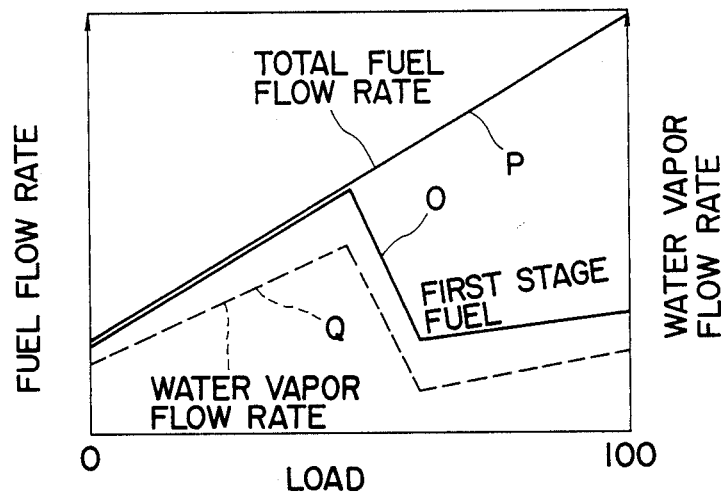
FIG. 11A is a graph representing a relationship between the load, the fuel flow rate and the water vapor flow rate of the gas turbine combustor according to this invention.
Figure 11B:
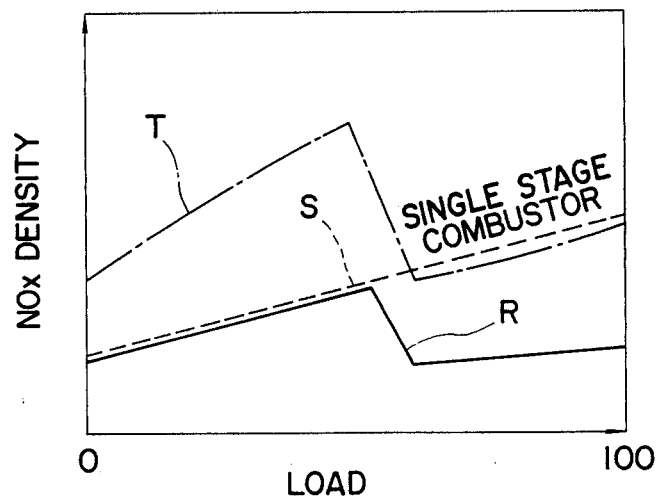
FIG. 11B is a graph showing the $NO_x$ density in connection with the relationship shown in FIG. 11A.

FIG. 11A is a graph representing the variations of the flow rate of the first stage fuel 100a (solid line 0), the flow rate of the total fuel 100 (solid line P), and the flow rate of the water vapor 101 (broken line Q) inputted in the operating unit 28 at the operation of the gas turbine combustor. FIG. 11B is also a graph representing the $NO_x$ density distribution curve R in the gas turbine combustor in a case where the respective flow rates 100a, 100, and 101 are controlled as represented by the graph of FIG. 11A. Referring to FIG. 11B, the broken line S shows the $NO_x$ density distribution curve in a case where the water vapor is injected in the single stage combustor and the one-dot and dash line T shows the $NO_x$ density distribution curve T in a case where the water vapor is not injected in the two stage premix combustor.

According to this invention, it should be understood that the gas turbine combustor is not limited to the described embodiments and various modifications and changes may be made without departing from the scope of the appended claims, and particularly, for example, the shape or structure of the outer wall of the combustor or premix casing can be made in variously modified forms.

The gas turbine combustor of this invention is applicable to the various types of gas turbine plants or combined cycle power generation plants.

What is claimed is:

1. A gas turbine combustor for a gas turbine plant comprising:

an outer casting having an end plate closing one end of said outer casing;

an inner cylinder constituting a combustor liner coaxially located with said outer casing, an interior of said combustor liner being divided into a first stage of combustion area which is disposed on an upstream side near said end plate and in which a first stage fuel and air are mixed and burned and a second stage of combustion area which is disposed on a downstream side of said first stage combustion area and in which a premixture of a second stage fuel diluted by air is supplied, said combustor liner being provided with a port means through which said premixture is supplied thereinto;

a first supply means including nozzle means for supplying water or vapor into said first stage of combustion area;

a second supply means for supplying the second stage fuel into said second stage combustion area; and means for stabilizing the combustion in said first stage of combustion area and holding a flame in said first stage of combustion area;

wherein the water or water vapor is mixed with first stage fuel at a high load operation period of a gas turbine so as to form a stabilized flame having no locally highly heated area in said first stage of combustion area by said stabilizing and holding means and the second stage fuel is burned with the premixture in said second stage of combustion area.

2. The gas turbine combustor according to claim 1 wherein said first supply means is located to said end plate and includes a nozzle member disposed at substantially a central portion of said end plate for ejecting the first stage fuel into said combustor liner and a first header means disposed to said end plate concentrically with said nozzle member and including a plurality of nozzles for ejecting the water or water vapour to be mixed with the first stage fuel in said first stage combustion area and said second supply means located to said end plate and includes a second header means disposed cocentrically with said nozzle member and said first header means and including a plurality of nozzles for ejecting the second stage fuel into said combustor liner.

3. The gas turbine combustor according to claim 2, wherein said combustor liner has a front head on the side of said end plate, said front head being provided with an opening at which said combustion stabilizing and flame holding means is disposed and wherein said nozzles of said first header means are provided with nozzle openings directed towards said combustion stabilizing and flame holding means for ejecting the water or water vapor.

4. The gas turbine combustor according to claim 1 further comprising a premixing casing located between said outer casing and said combustor liner to provide a premixing chamber therein which communicates with the interior of said combustor liner and in which the second stage fuel is diluted by air.

5. The gas turbine combustor according to claim 1, further comprising means for calculating and controlling flow rates of the first stage fuel, the second stage fuel and the water or water vapor in response to revolution speeds of a gas turbine and in accordance with a load applied thereto so that the flow rate of the water or water vapor is regulated in relation to the flow rate of the first stage fuel.

6. The gas turbine combustor according to claim 5, wherein said flow rate controlling means includes a first unit for controlling flow rate of the water or water vapor and a second unit for controlling total flow rate of the fuels and controlling fuel distribution.

7. The gas turbine combustor according to claim 3, wherein said combustion stabilizing and flame holding means is a swirler means.

8. The gas turbine combustor according to claim 1, wherein said port means is directed in said second stage of combustion area to supply the premixture therein substantially normally with respect to an axis of said combustor liner.

9. The gas turbine combustor according to claim 6, wherein said first unit for controlling the flow rate of the water or water vapor includes mans for setting a ratio of the flow rate of the water or water vapor with respect to the flow rate of the first stage fuel, means for calculating an aimed control value of the flow rate of the water or water vapor by multiplying the thus obtained set value by a measured value of the flow rate of the first stage fuel, and means for outputting the thus calculated aimed control value.

* * * * *